Sept. 9, 1941.   C. W. VOGT ET AL   2,255,136
LOOSE-LEAF BINDER
Filed Nov. 15, 1938   5 Sheets-Sheet 3
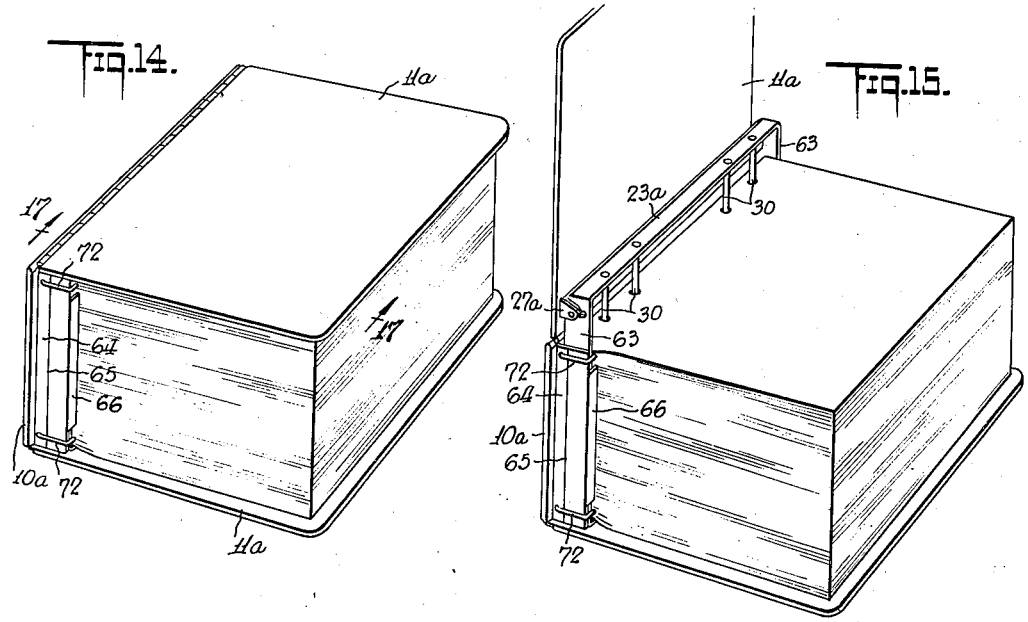
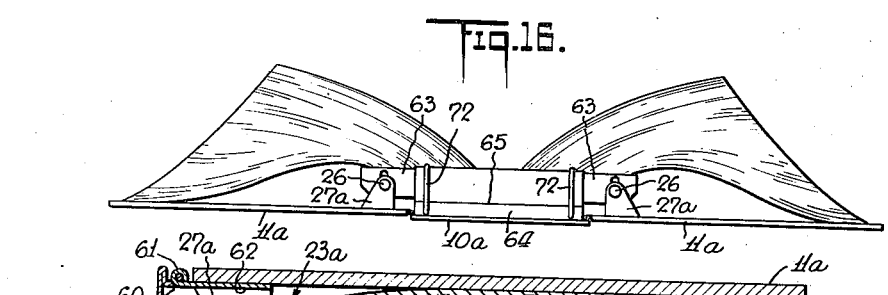
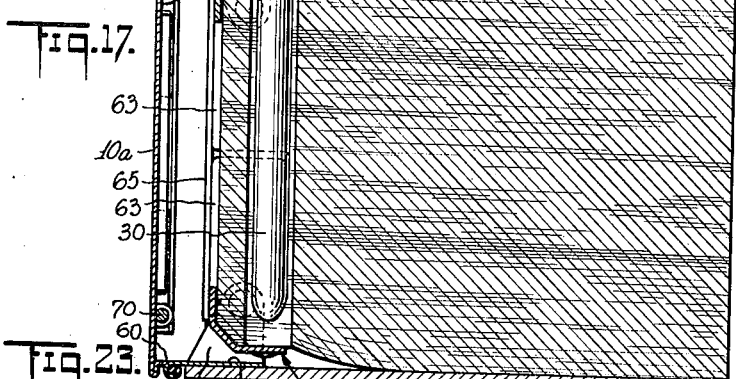
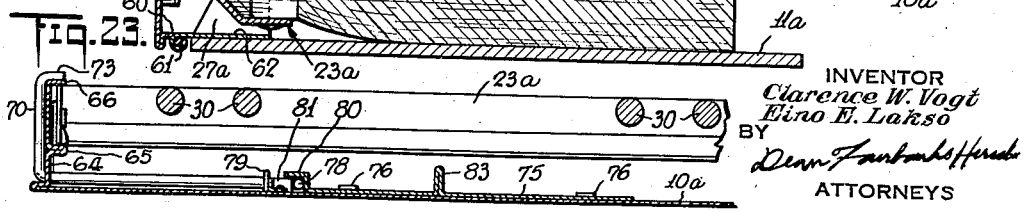
INVENTOR
Clarence W. Vogt
Eino E. Lakso
BY
ATTORNEYS

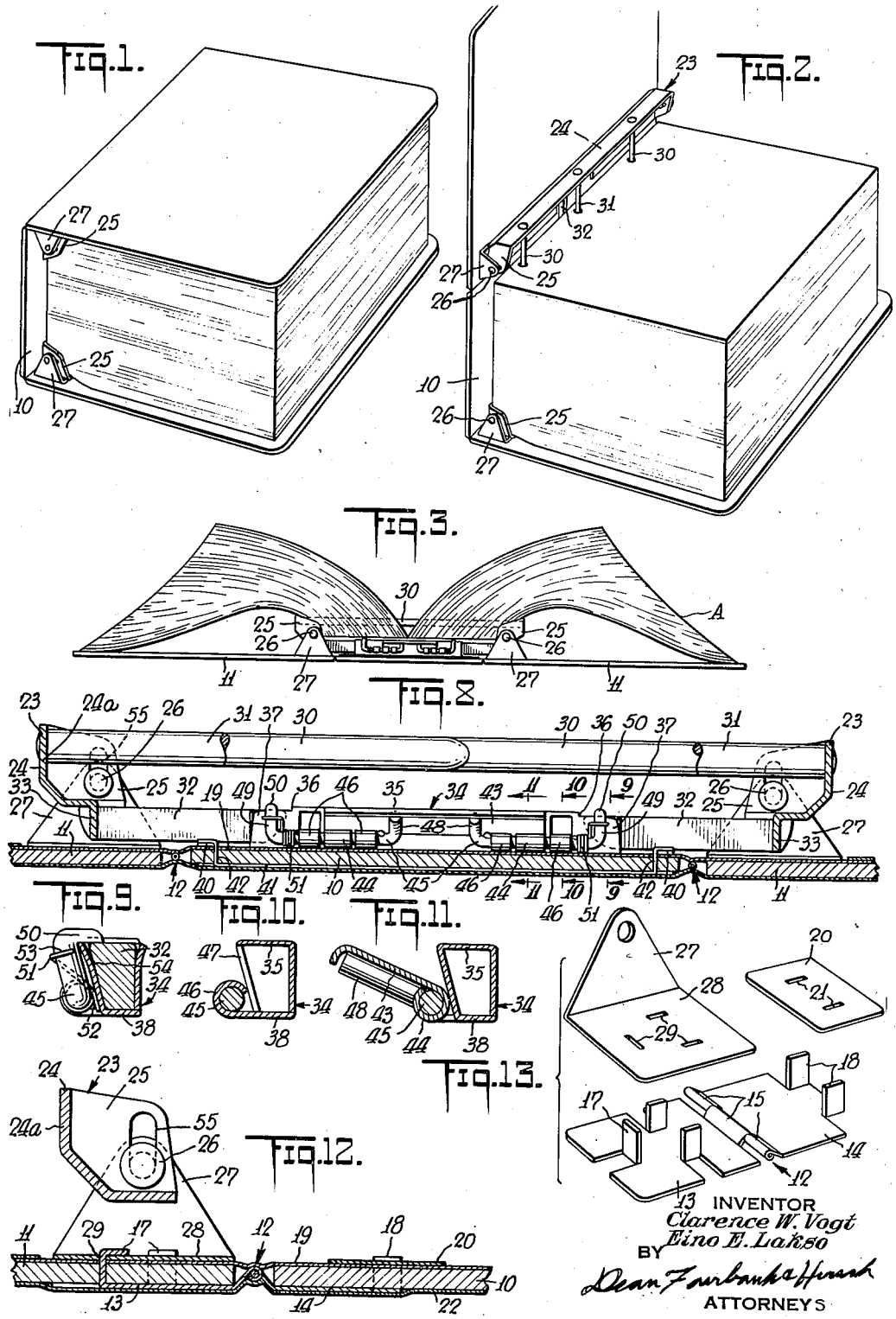

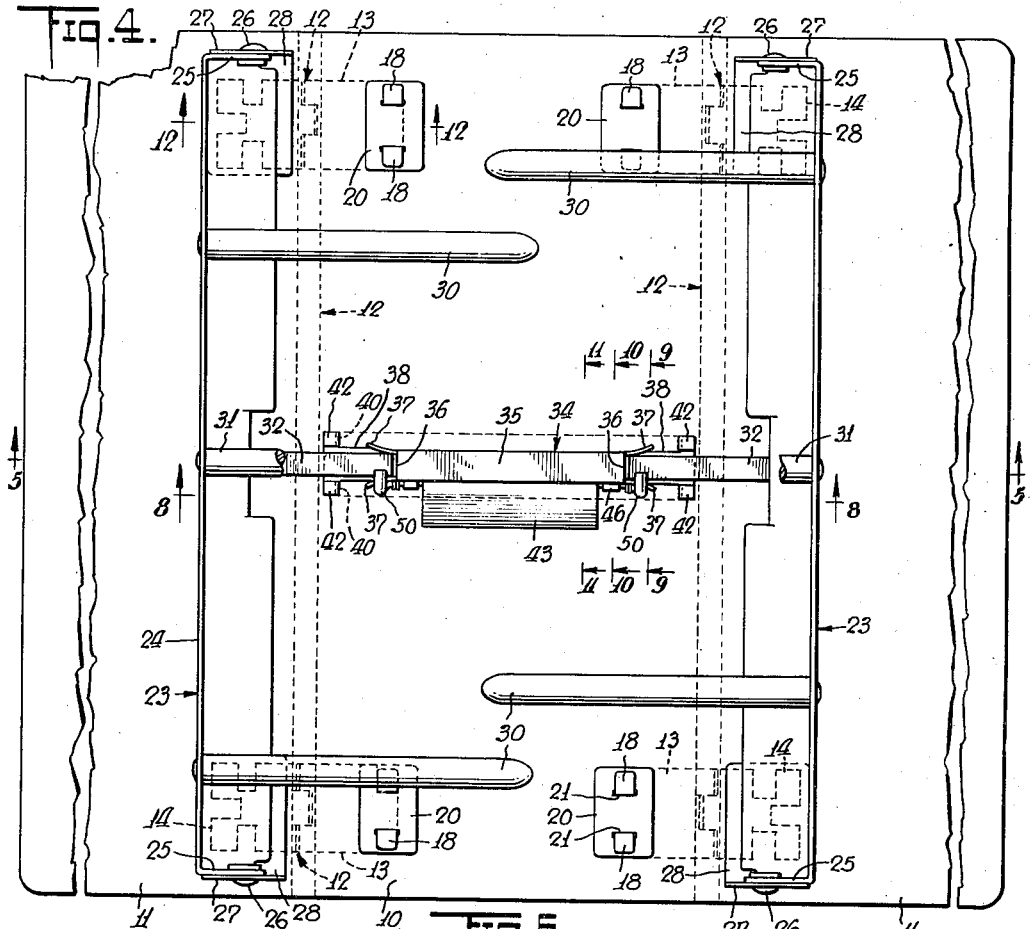

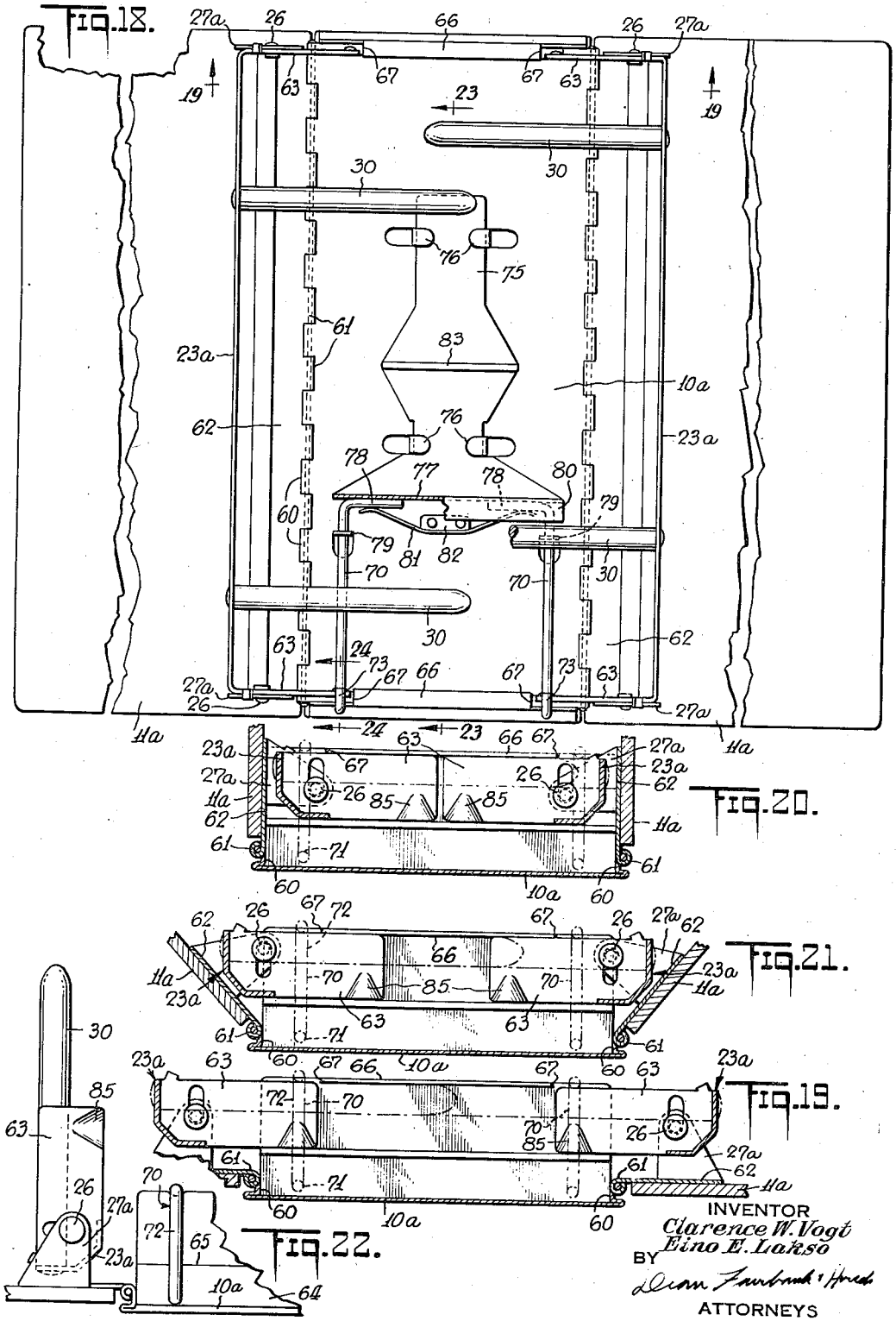

Sept. 9, 1941.  C. W. VOGT ET AL  2,255,136
LOOSE-LEAF BINDER
Filed Nov. 15, 1938  5 Sheets-Sheet 5
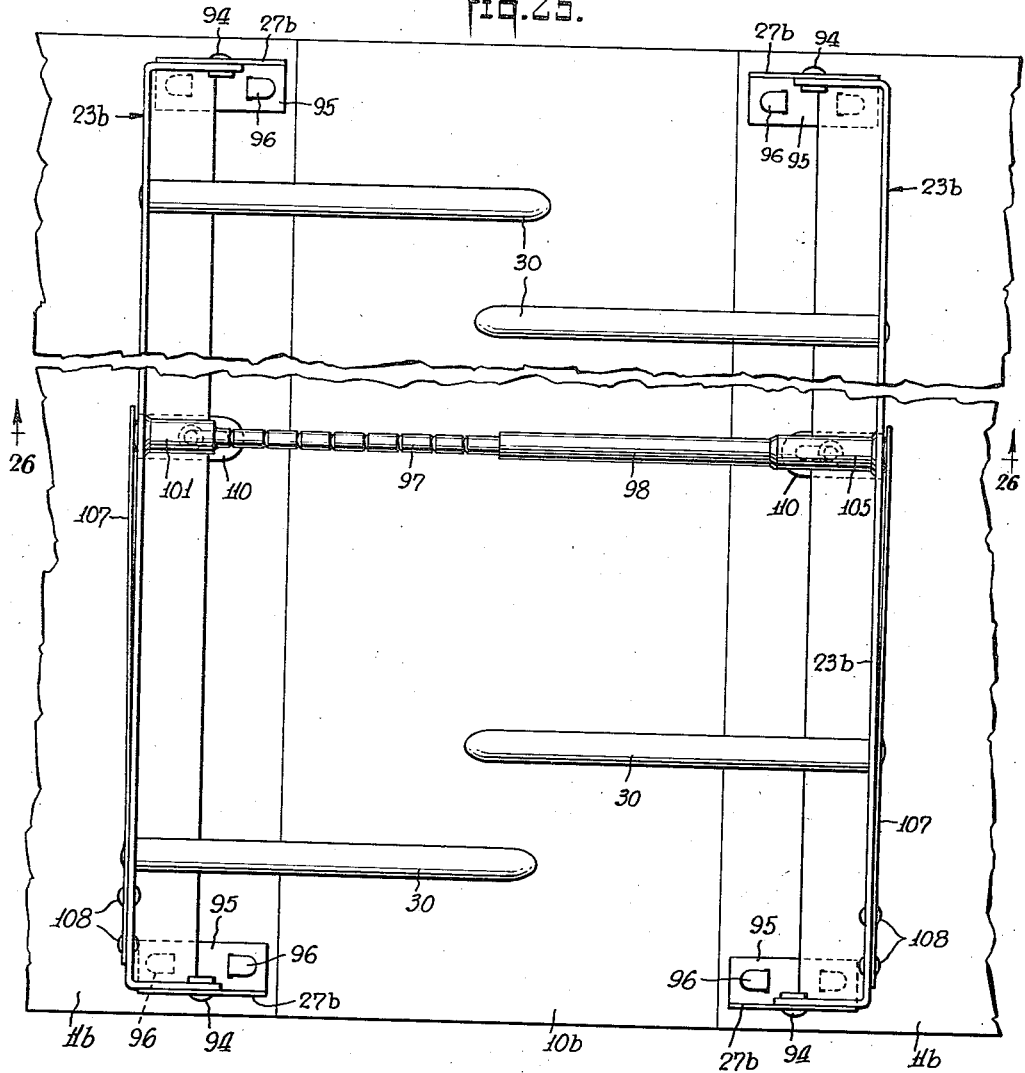
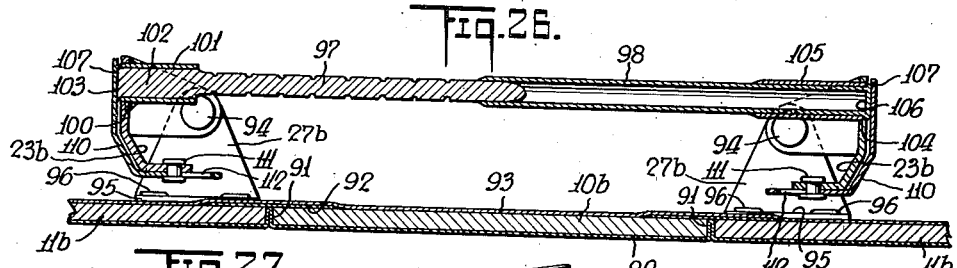
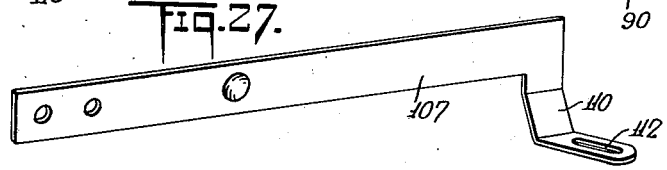
INVENTOR
Clarence W. Vogt
Eino E. Lakso
BY
ATTORNEYS Patented Sept. 9, 1941

2,255,136

UNITED STATES PATENT OFFICE 2,255,136

LOOSE-LEAF BINDER

Clarence W. Vogt, Norwalk, Conn., and Eino E. Lakso, Fitchburg, Mass.; said Lakso assignor to said Vogt Application November 15, 1938, Serial No. 240,492

24 Claims. (Cl. 129—13)

In the Lakso application Serial No. 234,341, filed October 11, 1938, there is disclosed a loose leaf binder of the straight prong type, comprising a pair of hinged covers having pivotally mounted thereon two opposed rows of sheet retaining prongs, which are movable endwise in opposite directions during the opening of said covers.

One object of the present invention is to simplify the above construction, while attaining all of its essential advantages and other additional advantages hereinafter set forth.

As a feature of the present invention, the prongs of one row are staggered with respect to, and overlap the prongs of the opposed row, and all of said prongs are held by releasable holding and guiding means in a single plane substantially parallel to the back. This release is effected without moving the staggered prongs of the two rows endwise beyond overlapping relationship.

As another feature, the prong holding means is in the form of a spring latch, automatically operable upon swinging movement of the prongs downwardly across the back.

As a further feature, the releasing means for the prong holding means is located at the center of the binder near the inner edge of the sheets, and is accessible for operation only when the binder is open, and only after the sheets have been divided into two widely separated batches on the prongs of the respective rows. This insures the retention of each batch entirely on its respective prong row, so that upon release of the holding means, the upward swinging of the two prong rows apart does not tear the sheets around their prong receiving apertures.

As a further feature, the releasing means is accessible for operation across a substantial portion of the width of the back, so that the sheet pack can be separated into two batches at any section thereof above said accessible portion, where it is desired to remove or insert a sheet, even though said section may be near either end of the pack.

Various other objects, features and advantages of the invention will be apparent from the following particular description and from an inspection of the accompanying drawings, in which:

Fig. 1 is a perspective of one form of binder, embodying our invention and shown in closed position, Fig. 2 is a perspective of the binder with one cover in open position, Fig. 3 is an elevation of the binder with both covers in open position, Fig. 4 is an inside face view of the empty binder in open position, Fig. 5 is a section taken on line 5—5 of Fig. 4, Fig. 5a is a detail section showing the prongs in released upward position with respect to the open covers, Fig. 6 is a section similar to that of Fig. 5, but showing the binder in partially open position, Fig. 7 is a section similar to that of Fig. 5, but showing the binder in closed position, Fig. 8 is a section taken on line 8—8 of Fig. 4, Figs. 9, 10 and 11 are detail sections taken on lines 9—9, 10—10 and 11—11 of Figs. 4 and 8 respectively, but on a larger scale, Fig. 12 is a section taken on line 12—12 of Fig. 4, but on a larger scale, Fig. 13 is a perspective of the cover hinge, the brackets on which the prongs are pivotally supported, and the bearing plate for said hinge, these members being shown in separated position, Fig. 14 is a perspective of another form of binder embodying our invention and shown in closed position, Fig. 15 is a perspective of the binder of Fig. 14, but shown with one cover in open position, Fig. 16 is an end view of the binder of Fig. 14, but shown with both covers in open position, Fig. 17 is a section taken on line 17—17 of Fig. 14, but shown on a larger scale, Fig. 18 is an inside face view of the empty binder of Fig. 14 shown in open position, Fig. 19 is a section taken on line 19—19 of Fig. 18, Fig. 20 is a section similar to that of Fig. 19, but showing the binder in closed position, Fig. 21 is a section similar to that of Fig. 19, but showing the binder in partially open position, Fig. 22 is an end view of a portion of the binder, showing the sheet retaining prongs in upright position with respect to their supporting cover, Figs. 23 and 24 are sections taken on lines 23—23 and 24—24 of Fig. 18 respectively, Fig. 25 is an inside face view of an open empty binder, constituting another embodiment of the invention, Fig. 26 is a section taken on line 26—26 of Fig. 25, and Fig. 27 is a perspective of a spring used in conjunction with the spring latch, for holding the prongs inwardly across the back in the construction of Fig. 25.

In the specific form of the invention shown in Figs. 1 to 13, the binder comprises a flat rigid non-bendable back 10, desirably of comparatively thick cardboard, and a pair of covers 11 also desirably of thick carboard, pivoted to the respective side edges of said back, and adapted in closed position of the binder to extend at right angles to said back as shown in Figs. 1 and 7, and in open position to extend in the plane thereof as shown in Figs. 3 and 5. The pivotal connection between each cover 11 and the back 10 includes a pair of hinges 12 (shown more fully in Fig. 13), each comprising a pair of leaves 13 and 14, secured to the cover and the back respectively, and having inner pintle engaging sections 15, lying between the opposed edges of said cover and said back.

In order to rigidly secure the hinges 12 in position, their leaves 13 and 14 have tongues 17 and 18 respectively, bent transversely from the planes thereof as best shown in Fig. 13. In assembling a hinge 12 in position, its leaves 13 and 14 are applied flat against the outer faces of the bare cover 11 and back respectively, with the fastening tongues 17 and 18 passing through corresponding slits in said cover and back, and through the usual fabric facing 19 on the inner surface of said cover and back as shown in Fig. 12. A bearing plate 20 with slits 21 corresponding to the tongues 18, is slipped over the projecting ends of said tongues, and seated over the fabric facing 19, and said tongue ends are bent over said plate. A similar bearing plate is provided for the hinge leaf 13, as will be hereinafter more fully described.

The usual outer fabric facing 22 is applied over the bare outer faces of the covers 11 and the back 10, and over the hinge leaves 13 and 14 to cover the same.

Pivotally carried by the covers 11 is a pair of parallel prong holders or frames 23, desirably stamped from sheet metal into the form of a yoke, and each comprising a longitudinal angle bar 24, and a pair of end flanges 25, extending transversely thereof and pivotally connected at 26 to the inner sides of brackets 27. These brackets 27 extend upwardly from, and are rigidly connected to the covers 11, and for that purpose, each of said brackets has a base flange 28, having a series of slits 29, corresponding to the tongues 17 of the hinge leaf 13, so that said base flange can be slipped over the projecting ends of said tongues and seated on the fabric facing 19. The projecting ends of these tongues 17 are bent over the base flange 28 as shown in Fig. 12, so that said flange serves not only to rigidly secure the bracket 27 to its corresponding cover 11, but also serves as a bearing plate for its corresponding hinge leaf 13.

Affixed to the upstanding leg 24a of each frame bar 24 is a row of straight sheet retaining prongs 30 of equal length, two in each row being shown extending transversely of said leg, and staggered with respect to and overlapping the prongs 30 of the opposed row connected to the other frame bar.

If desired, a pair of aligned short prongs 31 may be affixed to the centers of the bars 24 respectively, these prongs being parallel to and in the same plane as the prongs 30, and being of such length that they do not overlap in closed position of the binder.

The length of the prongs 30 is such, that when the covers 11 are in closed position as shown in Fig. 7, each prong will extend almost the full distance between the covers. In this closed position, the bar flanges 24a will face each other, and will lie closely adjacent to their respective covers 11, while the prongs 30 will lie in a single plane parallel to the back 10. Also in this position of the binder, the brackets 27 will have their pivotal mountings 26 spaced inwardly from the side edges of the back as shown in Figs. 1 and 7.

As the covers 11 are swung into open position, they will carry the brackets 27 with them, thereby causing their pivotal mountings 26 to move outwardly from the side edges of the back 10, until said covers are in the plane of said back as shown in Figs. 3, 4 and 5. As these pivotal mountings 26 are moved outwardly from their original positions shown in Figs. 1 and 7, they will carry the prong frames 23 outwardly with respect to the side edges of the back 10, thereby separating them to a greater distance and moving the two rows of prongs apart. This operation is not sufficient to move the two rows of prongs 30 beyond overlaping relationship, so that while these prongs are held downwardly in a single plane parallel to the back 10, the sheets will be retained on said prongs, and can be turned toward either cover.

As the covers 11 are moved from a closed to an open position, the sheets A are flattened out as shown in Fig. 3, causing them to apply a leverage to the prongs 30 and 31, tending to swing them upwardly about their pivotal supports 26 into the position shown in Fig. 5a.

Releasable means are provided for holding the prongs 30 and 31 in a single plane parallel to the back, and to confine the movements of said prongs endwise as the binder is opened and closed. In the specific form shown, this holding means comprises a pair of aligned holding pins 32, fixed to respective frame bars 24 near their centers, desirably by stamping therefrom downwardly extending flanges 33 to which the ends of the pins are riveted and/or soldered. These holding pins 32 are parallel to the prongs 30 and 31, extend close to the back 10 and below the lower edges of the sheets, and are guided for endwise movement in a rail in the form of a guide housing 34, fixed to the inner face of the back 10. In the specific form shown, this housing comprises a sheet of metal, bent longitudinally into quadrilateral cross-section as shown in Figs. 9, 10 and 11. The top wall 35 of this housing is cut away at 36, while the side walls 37 beyond said top wall are flared apart to facilitate entry of the holding pins 32 therein. The bottom wall 38, resting on the inner fabric facing 19 of the back 10, extends endwise beyond the flared side walls 37, and terminates at each end in a pair of transverse tabs 40. In order to hold the guide housing 34 securely to the back 10, there is provided a metal holding strip 41, extending along the outer bare face of said back, and having a pair of spaced tongues 42 at each end passing through slits in the back, and bent outwardly over the tabs 40 on the inner face of the back as shown in Figs. 4 and 8.

The cross-section of the housing 34 conforms substantially with, but is slightly larger than the cross-section of the holding pins 32, to permit said pins to ride freely in the housing as the binder is opened and closed. The length of these holding pins 32 is such, that in open position of the binder shown in Figs. 3, 4, 5 and 8, the free ends of said pins are spaced a very short distance from the respective ends 36 of the top wall 35, so that these holding pins are free to swing about the pivotal mounts 26 from this position to positions shown in Fig. 5a.

In order to insure the locking of the pins 32 against release from alignment with the guide housing 34 in the open position of the binder shown in Figs. 3 and 4, there is provided a spring latch, operated from a spring pressed plate lever 43 of substantial length, extending longitudinally along one side of said guide housing. For pivotally supporting this lever, curved tongue extensions 44 at the lower ends thereof loosely engage pintles 45 respectively, and mate with curved pintle engaging sections 46 cut out of the side wall 47 of the guide housing.

Two of these pintles 45 are provided, and each has an inner upturned end 48, engaging the under surface of the plate lever 43, and an outer upturned end 49 beyond said lever, terminating in a transverse bevel-headed catch 50, adapted to extend across the open top portion of the guide housing 34 as shown in Fig. 9. This catch 50 is urged into locking position across the top of its respective holding pin 32 desirably by a coil spring 51, one end 52 of which is anchored against a side wall of the guide housing 34, the other end 53 being wound around the pintle section 49 as shown in Fig. 9. This spring 51 also transmits its torsional stress to the lever engaging end 48 of the pintle 45, and therefore urges the lever 43 in the angular position shown in Fig. 11, this position being determined by the stop engagement of the other pintle end 49 with the guide housing 34.

In order to move the catches 50 outwardly against the action of the springs 51 to permit swinging entry of the holding pins 32 into alignment with the guide housing 34, the side surfaces 54 of said pins opposite said catches are bevelled as shown in Fig 9, so that said pins, as they move downwardly, cam said catches out of the way.

To permit upward swinging of the prongs 30 and 31 about their pivotal mountings, the lever plate 43 is depressed. This operation causes outward movement of the catches 50 out of engagement with the holding pins 32, so that the leverage of the open sheets on the prongs 30 and 31 swings said prongs upwardly substantially at right angles to the open covers 11.

Upon swinging movement of the prongs 30 and 31 from upright position towards the back 10, the holding pins 32, when they reach the base of the housing 34, will limit further angular movement of said prongs towards said back. In this limited position, the prongs 30 and 31 will be parallel to the back 10, and the catches 50 will automatically move into position to lock said prongs for endwise movement.

The pivotal mountings 26 of the prong frames 23 are of the slide type, to permit the guided movement of the prongs 30 and 31 in a plane parallel to the back 10. For this purpose, the pivot hole 55 in each prong holder flange 25 is elongated in a direction at right angles to the back 10, so that the swinging movement of the brackets by the opening and closing of the binder causes translatory movement of the prong frames 23 parallel to the back Since the lever 43 is located at the center of the binder below the inner edges of the sheets, it is accessible for operation only when the binder is open, and only after the sheets have been divided into two widely separated batches on the prongs of the respective rows, to permit the fingers of the operator to reach said lever. Therefore, the operator, in reaching for the lever 43, moves the two sheet batches apart sufficiently to clear the overlapping sections of the two rows of prongs 30, so that tearing of the sheets around their prong receiving apertures caused by the upward swinging of the two released prong rows apart will be avoided.

The lever 43 extends across a substantial portion of the width of the back 10, and since this lever is accessible for operation by the separation of the sheet pack at any section above said lever, it is seen that this construction permits separation of the sheet pack at that section where it is desired to remove or insert a sheet, even though said section may be near either end of the pack.

In Figs. 14 to 24 is shown another form of binder, in which the back 10a is made of metal, and has upstanding integral pintle engaging side sections 60, mating with pintle engaging sections 61 in the inner sides of hinge leaves 62, affixed to the covers 11a respectively, to form a hinge connection between said covers and said back. The covers 11a are desirably of comparatively rigid cardboard, and these covers, as well as the back 10a, are covered with suitable fabric facings (not shown).

Each of the prong frames 23a has a pair of parallel comparatively long end flanges 63, pivotally mounted to the brackets 27a respectively by slidable pivotal mountings 26, similar to those of the construction of Figs. 1 to 13, to permit translation of these frames parallel to the back 10 as the binder is opened and closed. In the specific form shown, these brackets 27a form upward integral end flanges of the hinge leaves 62, which extend substantially the full length of the covers.

In order to guide the prongs 30 for endwise movement in a single plane parallel to the back, the ends of the back 10a have upward extensions 64, the intermediate portions 65 of which are doubled over inwardly parallel to the back 10a to form base rails, and the upper end portions 66 of which are bent transversely inwardly to form lips. Between the base rail 65 and the lip 66 of each extension 64 there is thereby formed a guide channel, which is parallel to the back 10a, and into which ride the long prong frame flanges 63.

The ends 67 of the lips 66 are spaced inwardly from the ends of the upward extensions 64, and the prong frame flanges 63 are of such length, that in open position of the binder shown in Figs. 18 and 19, the free ends of said flanges are spaced outwardly a short distance from the corresponding ends of said lips, to permit said flanges to swing upwardly out of the guide channels and about their pivotal mountings 26 into the position shown in Fig. 22.

In order to hold the prong frames 23a against swinging movement about their pivotal mountings 26 in open position of the binder, there is provided at one end of the binder a pair of substantially parallel holding pins 70, held against rotation by means hereinafter to be described, and slidably extending through apertures 71 in an upright extension 64. The outer end sections 72 of these holding pins 70 are bent upwardly along the outer face of said extension, and the extreme ends of these pins are bent inwardly across the top of said extension to form catches 73, and are spaced outwardly from the corresponding ends of the lips 66, to engage the upper edges of the prong frame flanges 63, and prevent them from swinging upwardly about their pivotal mountings 26. These catches 73 also serve to hold the flanges 63 in alignment with the guide channels, so that when the binder is closed or partially closed in the positions shown in Figs. 20 or 21, these flanges will ride smoothly into said guide channels.

Means are provided for moving the holding pins 70 lengthwise thereof in order to release the catches 73 from engagement with the prong frame flanges 63. For that purpose, there is provided a slide plate 75, resting on the inner face of the back 10a, and guided for longitudinal movement lengthwise of said back between guide tongues 76, strucked inwardly from said back and bent over said slide plate as shown in Fig. 18. The end section 77 of said slide plate nearest the holding pins 70 is bent transversely of the plane thereof, to engage the inwardly offset ends 78 of the holding pins, so that the slide movement of the plate 75 is transmitted to the holding pins 70. These pins 70 are guided for slidable movement in tongues 79 strucked upwardly from the back 10a, and are held against rotation by a lip 80 at the upper end of the slide wall 77, abutting the offset ends 78 of said holding pins 70.

In order to urge the pins 70 into locking position with respect to the prong frame flanges 63, there is provided a leaf spring 81, which has an integral base 82 at the center thereof, riveted or otherwise secured to the inner face of the base 10a, and which has its free ends pressing the offset ends 78 of said pins against the end wall 77 of the slide 75.

In order to provide means by which the slide 75 may be conveniently manipulated to release the catches 73, an intermediate portion 83 of said slide is doubly bent upwardly from the back 10a to form a suitable handle, said slide being widened at said handle 83, so that it is accessible for manipulation within a wide range across the width of said back.

In the operation of the binder, the catches 73 are normally latched in position, so that as the covers are opened and closed, the prong frame flanges 63, riding in the guide channels will cause the prongs 30 to move endwise in a plane parallel to the back 10a. When it is desired to insert or remove a sheet, the binder is opened into the position shown in Figs. 18 and 19, and the sheet pack divided at the section where it is desired to insert or remove the sheet to gain access to the handle 83. The sheets are divided a sufficient distance to clear the overlapping ends of the prongs as in the construction of Figs. 1 to 13, and the slide 75 is moved downwardly as shown in Fig. 18 through manipulation of the handle 83. This downward movement of the slide 75 causes the endwise movement of the holding pins 70 against the action of the leaf spring 81, so that the catches 73 are moved out of the path of pivotal movement of the prong frame flanges 63. The prong frames 23a, under the leverage of the open sheets, will thereby swing into the position shown in Fig. 22. Upon release of the slide 75, said slide will return to its normal position shown in Fig. 18, and the catches 73 will then again move into locking position across the top of the open ends of the guide channel. When the prong frames are again moved into the position shown in Fig. 18 about their pivotal mountings 26, the prong frame flanges 63, engaging the ends of the catches 73, will move said catches downwardly as shown in Fig. 18, to permit said flanges to continue their movement into alignment with the guide channels. When the upper edges of these flanges have reached below the catches 73, these catches will return into latched position to prevent upward swinging of said flanges.

In order to facilitate the movement of the prong frame flanges 23a from the position shown in Fig. 22 into the position shown in Fig. 18, each of said flanges is formed at its lower side with an inwardly extending conical depression 85, so that it will gradually cam the catches 73 out of the way of said flanges, as said flanges are moved into locked position.

In Figs. 25 to 27 there is shown another form of binder, comprising a back 10b and covers 11b, made of comparatively thick cardboard. The hinge connection between the covers 11b and the back 10b is formed by the fabric facings, and for that purpose, the outer fabric facing 90 has infolded sections 91 between the opposed side edges of said back and said covers, affording expansion of said facings at said sections for angular movement of the covers. On the inner face of the covers 11b and the back 10b, there is desirably secured across the opposed edges thereof reinforcing fabric strips 92, underlying the main inner fabric facing 93.

The prong frames 23b with their prongs 30 secured thereto are similar to those shown in the construction of Figs. 1 to 13, but are supported by fixed pivotal mounts 94 to the brackets 27b. Each of these brackets 27b has a base 95, secured to its respective cover 11b by any suitable means, as for instance a plate (not shown) having tongues 96 passing from the outer face of said covers through slits in said covers and bent over said base.

In order to guide the prongs 30 for substantially endwise movement as the binder is opened and closed, there is provided a pair of axially aligned holding pins or prongs 97 and 98, supported to the middle of the prong frames 23b respectively in the plane of the prongs 30, and telescoped with respect to each other in closed or open position of the binder. To provide for the telescopic engagement of the two prongs 97 and 98, the outer prong 98 is tubular and telescopes over the inner prong 97, to form a guide channel or rail for said latter prong.

The two telescoping prongs 97 and 98 are slidably supported on the prong frames 23b, to permit slidable movement of said prongs endwise beyond telescopic relationship after the binder has been opened to the position shown in Figs. 25 and 26. For that purpose, there is fixed by soldering or the like in a hole 100 of one of the prong frames, a guide sleeve 101, slidably receiving the enlarged rear section 102 of the prong 97, the end 103 of this prong being flanged to limit the inner slide movement of said prong to the position shown in Fig. 26. In a hole 104 of the other prong frame 23b, there is similarly fixed a guide sleeve 105 for slidably receiving the tubular prong 98, the rear end 106 of which is radially enlarged to limit inner slide movement of said prong in said sleeve.

The two prongs 97 and 98 are spring latched into telescopic relationship by leaf springs 107, riveted or otherwise secured at 108 to the respective prong frames 23b, and bearing at their free ends against the rear ends of the prongs 97 and 98 respectively.

The telescoping prongs 97 and 98, like the prongs 30 are impaled in the apertures of the sheets, and in opening and closing the binder, these telescoping prongs serve as means for holding and guiding said prongs 30 in sheet retaining position parallel to the pack. In order to free the prongs 30 so that they can swing into upright position under the influence of the leverage of the open sheets, either one of the telescoping prongs is manually slid outwardly against the action of its respective spring 107, and beyond telescoping relationship with the other prong.

In order to limit the outward slide movement of the prongs 97 and 98, each of the leaf springs 107 has a transverse extension 110 at its free end, bent into substantial conformity with its respective prong frame 23b. A pin 111 fixed to each of the prong frames 23b passes through an elongated slot 112 in the transverse extension 110 of the spring 107, so that when the outer end of said slot reaches said pin, the outward movement of said spring is stopped.

Since the telescopic prongs 97 and 98 are in the middle of the binder, it is necessary to separate the sheets into two batches to gain access to said prongs as in the construction of Figs. 1 to 24. Furthermore, since either one of these telescoping prongs is manually slidable to release the latch telescopic engagement thereof, the sheet pack can be divided at any section where it is desired to move or insert a sheet, even though said section is near the end of the pack.

As many changes could be made in the above construction, and many apparently widely different embodiments of this invention could be made without departing from the scope thereof, it is intended that all matter contained in the above description or shown in the accompanying drawings shall be interpreted as illustrative and not in a limiting sense.

Having thus described our invention, what we claim as new and desire to secure by Letters Patent is:

1. A loose leaf binder comprising a back, a pair of covers hinged to and non-extensible with respect to said back, two opposed rows of pivotally supported substantially straight sheet retaining prongs extending between said covers in a plane substantially parallel to said back in closed position of said binder, and relatively movable endwise to afford extra space for the sheets on said prongs, means for holding said prongs substantially in said plane during the endwise movement of said prongs, and means accessible for operation only from the approximate center of said back near the lower edges of the retained sheets, for releasing said holding means, to permit said prongs to swing about their pivotal supports into position substantially at right angles to said covers in open position of the binder.

2. A loose leaf binder comprising a back, a pair of covers hinged to said back, two opposed rows of sheet retaining prongs extending across said back in closed position of the binder, a pivotal connection between each of said rows and a respective cover, said pivotal connections being movable laterally with respect to the cover hinges upon the opening movement of said covers, to thereby move said prongs substantially endwise to afford extra space for the sheets on said prongs, means spaced from said prongs for holding said prongs across said back in open position of the binder, and means accessible for operation only from the approximate center of the back near the inner edges of the retaining sheets, and along a substantial length across said back for releasing said holding means, to permit said prongs to swing about their pivotal mounts into position transversely of the plane of said back.

3. A loose leaf binder comprising a back, a pair of covers hinged to and non-extensible with respect to said back, two opposed rows of sheet retaining prongs extending across said back between said covers in closed position of the binder and overlapping at their free ends, the prongs of one row being staggered with respect to the prongs of the other row, means operable upon opening movement of one of said covers for moving said two rows of prongs apart, but not out of overlapping relationship, latch means for holding said rows of prongs in the same plane substantially parallel to said back in open position of said binder, while permitting endwise movement of said prongs, and means for releasing said latch means to permit said two rows of prongs to be moved out of overlapping relationship and swung into separate planes, whereby sheets may be inserted in or removed from said binder, said latch means being automatically operable to hold either row of prongs in said first mentioned plane, when said last-mentioned row of prongs is swung back into said first-named plane, without the necessity of hand manipulating the other row of prongs into said first-mentioned plane.

4. A loose leaf binder comprising a back, a pair of covers hinged to said back, two opposed rows of sheet retaining prongs extending across said back, and overlapping at their free ends in open or closed position of the binder, the prongs of one row being staggered with respect to the prongs of the other row, and the two rows being movable relatively apart upon opening movement of either cover, a guide member defining a rail parallel to said back and spaced from said prongs, and a member movable and rigid with one of said prong rows, and slidable on said rail for confining the movement of the prongs of said latter row in a plane substantially parallel to said back.

5. A loose leaf binder comprising a back, a pair of covers hinged to said back, two opposed rows of pivotally supported sheet retaining prongs in staggered relationship extending across said back in closed position of the binder, and having their free ends in overlapping relationship in open or closed position of the binder, said two rows of prongs being movable relatively apart, a guide member fixed to said back, and defining a rail parallel to said back and extending between said covers, a pair of members movable with said prong rows respectively, and slidable along said guide member to confine movement of said prongs in a plane substantially parallel to said back, said members in open position of the binder extending beyond the ends of said guide member, and releasable holding means for said members in open position of the binder.

6. A loose leaf binder comprising a back, a pair of covers hinged to said back, two opposed rows of sheet retaining prongs extending across said back, a pivotal connection between each of said rows and a respective cover, said pivotal connections being movable laterally with respect to the cover hinges upon the opening movement of said covers, to thereby move said prongs substantially endwise to afford extra space for the sheets on said prongs, a guide channel secured and parallel to said back, and a member rigid with respect to each respective prong row, and slidable in said channel, for holding said prongs substantially parallel to said back in the opening and closing movement of said binder.

7. In a loose leaf binder, the combination comprising a back, a pair of covers hinged to said back, a pair of prong frames, one extending lengthwise of one of said covers and the other extending lengthwise of the other cover, parallel sheet retaining prongs secured to said frames and extending across said back in closed position of the binder, pivotal connections between said frames and said covers, said connections being movable laterally with respect to their respective cover hinges upon the opening movement of said covers, to thereby move said prongs substantially endwise to afford extra space for the sheets on said prongs, a member rigidly connected to said prong frame, a spring pressed latch engaging said member for holding said member substantially parallel to said back, whereby said prongs are similarly held substantially parallel to said back in open position of the binder, and means accessible for operation only near the approximate center of the binder and near the inner edges of the retained sheets for releasing said latch to permit said prongs to swing about their pivotal supports, said latch being in position to automatically hold said prongs in said position parallel to said back for endwise movement of said prongs upon mere movement of said prongs in said position.

8. A loose leaf binder comprising a back, a pair of covers hinged to said back, two opposed rows of substantially straight sheet retaining prongs extending between said covers in a plane substantially parallel to said back in closed position of said binder, means responsive to the opening movement of either of said covers for moving the two rows of prongs substantially and relatively endwise to afford extra space for the sheets on said prongs, a guide channel secured to said back near the center thereof below the plane of said prongs in closed position of the binder, and a pair of holding pins below the plane of said prongs in closed position of the binder mounted for movement with said rows of prongs respectively, and slidable endwise in said guide channel for holding said prongs substantially in said plane during the opening movement of said latter cover.

9. In a loose leaf binder, the combination comprising a back, a pair of covers hinged to said back, two opposed rows of straight sheet retaining prongs extending across said back and between said covers in closed position of the binder, a slidable pivotal connection between one of said prong rows and a respective cover, said pivotal connection being movable laterally with respect to the respective cover hinge upon the opening movement of said cover, to thereby move the prongs of said row substantially endwise relative to the other prongs to afford extra space for the sheets on said prongs, said prong row being slidable along its pivotal connection to confine the movement of said prong row to a translatory one in a constant plane and means for holding said prongs across said back in open position of the binder, to maintain said prongs in said plane during the movement of said binder.

10. A loose leaf binder comprising a back, a pair of covers hinged to said back, a pair of opposed substantially parallel pivotally supported prong frames, slidable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, a guide channel fixed to the back, two aligned holding members, fixed to said frames respectively, and slidable in said channel, the free ends of said holding members extending outwardly beyond the corresponding ends of said guide channel in open position of the binder, a pair of latch members engaging said holding members respectively, outwardly beyond the ends of said guide channel in open position of the binder, to hold said prongs parallel to said back, and means for releasing said latch members to permit said frames to swing about their pivotal support, to bring said prongs in different planes transversely of the open covers.

11. A loose leaf binder comprising a back, a pair of covers hinged to said back, a pair of opposed substantially parallel pivotally supported prong frames, slidable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, a guide channel fixed to the back, two aligned holding members fixed to said frames respectively, and slidable in said channel, the free ends of said holding members extending outwardly beyond the corresponding ends of said guide channel in open position of the binder, a pair of latch members engaging said holding members respectively beyond the ends of said channel in open position of the binder to hold said prongs parallel to said back, and a handle accessible for operation at the center of the back below said plane for releasing said latch members to permit said frames to swing about their pivotal support, to bring said prongs in different planes transversely of the open covers.

12. A loose leaf binder comprising a back, a pair of covers hinged to said back, a pair of opposed substantially parallel pivotally supported prong frames, slidable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, a guide channel fixed substantially to the middle of the back below said plane, two aligned holding pins fixed to said frames respectively and slidable in said channel, the free ends of said holding pins extending outwardly beyond the corresponding ends of said guide channel in open position of the binder, a pair of latch members engaging said pins respectively outwardly beyond the ends of said guide channel in open position of the binder, to hold said prongs parallel to said back and an operating member near said guide channel for releasing said latch members to permit said frames to swing about their pivotal support, to bring said prongs in different planes transversely of the open covers.

13. A loose leaf binder comprising a back, a pair of covers hinged to said back, a pair of opposed substantially parallel pivotally supported prong frames, slidable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, a guide channel fixed to the back at one end thereof, two aligned holding members fixed to said frames respectively and slidable in said channel, the free ends of said holding members extending outwardly beyond the corresponding ends of said guide channel in open position of the binder, a pair of latch members engaging said holding members respectively, outwardly beyond the ends of said guide channel in open position of the binder, to hold said prongs parallel to said back, and means accessible for operation at the center of the back below said plane for releasing said latch members to permit said frames to swing about their pivotal support, to bring said prongs in different planes transversely of the open covers.

14. A loose leaf binder comprising a back, a pair of covers hinged to said back, a pair of opposed substantially parallel prong frames having pivotally supported end flanges, said frames being slidable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, a guide channel fixed to the back at one end in alignment with said flanges to slidably receive the same, the free ends of said flanges extending beyond the corresponding ends of said guide channel in open position of the binder, a pair of latch members engaging said flanges respectively, outwardly beyond the ends of said guide channel, in open position of the binder to hold said prongs parallel to said back, and means for releasing said latch members to permit said frames to swing about their pivotal support, to bring said prongs in different planes transversely of the open covers.

15. A loose leaf binder comprising a back, a pair of covers hinged to said back, a pair of opposed substantially parallel prong frames, having pivotally supported end flanges, said frames being movable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, a guide channel fixed to the back at one end in alignment with said flanges to slidably receive the same, the free ends of said flanges extending beyond the corresponding ends of said guide channel in open position of the binder, a pair of catches spring pressed into engagement with said flanges respectively, at sections thereof outwardly beyond the ends of said guide channel in open position of the binder, to hold said prongs parallel to said back, and a member slidable along the inner face of said back for releasing said catches, to permit said frames to swing about their pivotal support to bring said prongs in different planes transversely of the open covers.

16. A loose leaf binder comprising a back, a pair of covers hinged to and non-extensible with respect to said back, a pair of opposed substantially parallel pivotally supported prong frames movable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, and a pair of aligned pins connected to said frames respectively and parallel to said prongs, and telescoping at their free ends for holding said prongs substantially parallel to said back during movement of said prong frames, one of said pins being slidable with respect to the other and with respect to said frames beyond telescoping relationship in open position of the binder, to permit said prong frames to swing about their pivotal supports to bring said prongs in planes transversely of the open covers.

17. A loose leaf binder comprising a back, a pair of covers hinged to said back, a pair of opposed substantially parallel pivotally supported prong frames, movable transversely towards and away from each other, two rows of sheet retaining prongs secured to said frames respectively, extending across said back between said covers in a plane substantially parallel to said back in closed position of the binder, and overlapping at their free ends, the prongs of one row being staggered with respect to the prongs of the other row, a pair of aligned holding prongs, parallel to said sheet retaining prongs in the planes of said prong rows respectively, and slidably secured on said prong frames respectively for endwise movement, and spring means urging said holding prongs into telescoping relationship, said holding prongs being movable relatively apart against the action of said spring means and beyond telescoping relationship, to permit said prong frames to swing about their pivotal supports, to bring said sheet retaining prongs into planes transversely of the open covers.

18. A loose leaf binder comprising a back, a pair of covers hinged to said back, a pair of opposed substantially parallel pivotally supported prong frames, movable transversely towards and away from each other, two rows of sheet retaining prongs secured to said frames respectively, extending across said back between said covers in a plane substantially parallel to said back in closed position of the binder and overlapping at their free ends, the prongs of one row being staggered with respect to the prongs of the other row, a pair of aligned holding prongs parallel to said sheet retaining prongs in the planes of said prong rows respectively, and secured on said prong frames respectively for endwise movement, leaf springs secured at one end to said prong frames respectively, and pressing at their free ends against the rear ends of said holding prongs to hold said holding prongs in telescoping relationship, said holding prongs being movable relatively apart beyond telescoping relationship against the action of said springs, to permit said prong frames to swing about their pivotal supports to bring said sheet retaining prongs into planes transversely of the open covers.

19. A loose leaf binder comprising a back, a pair of covers hinged to said back, a pair of opposed substantially parallel pivotally supported prong frames, movable transversely towards and away from each other, two rows of sheet retaining prongs secured to said frames respectively, extending across said back between said covers in a plane substantially parallel to said back in closed position of the binder and overlapping at their free ends, the prongs of one row being staggered with respect to the prongs of the other row, a pair of aligned holding pins parallel to said sheet retaining prongs secured on said prong frames respectively for endwise movement, one of said holding pins being slidable with respect to its supporting prong frame, a spring urging said latter pin into telescoping relationship with the other pin, and movable against the action of said spring beyond telescopic engagement with said other pin, to permit said prong frames to swing about their pivotal supports to bring said sheet retaining prongs into planes transversely of the open covers, and means limiting the extent of slide movement of said slidable pin beyond telescopic relationship with said other pin.

20. A loose leaf binder comprising a back, a pair of covers hinged to said back, two pivotally supported opposed rows of substantially straight sheet retaining prongs extending across said back in a single plane, and movable towards and away from each other, means for holding said prongs substantially in said plane during movement of said prongs towards and away from each other, a lever having a finger piece section near the center of said back inwardly of the inner edges of the mounted loose sheets, whereby access to said finger piece can be effected only after the binder is open and only after the sheets have been separated into two batches to afford a space over said finger piece between the separated batches, and means responsive to a depressing movement of said finger piece towards said back for releasing said holding means, to permit said two rows of prongs to swing about their pivotal supports into different planes.

21. A loose leaf binder comprising a back, a pair of covers hinged to said back, two pivotally supported opposed rows of substantially straight sheet retaining prongs extending across said back in a single plane, and movable towards and away from each other, means for holding said prongs substantially in said plane during movement of said prongs towards and away from each other, a spring-pressed lever mounted near the center of said back inwardly of the inner edges of the mounted loose sheets, and extending along a substantial distance across said back substantially at right angles to the hinged edges of the covers, said lever being accessible only when the covers are open and the sheets are spaced apart over said lever, and means responsive to a depressing movement of said lever towards said back and against the spring for releasing said holding means, to permit said two rows of prongs to swing about their pivotal supports in different planes.

22. A loose leaf binder comprising a back, a pair of covers hinged to said back, two pivotally supported opposed rows of substantially straight sheet retaining prongs extending across said back in a single plane, and movable towards and away from each other, means for holding said prongs substantially in said plane during movement of said prongs towards and away from each other, a finger piece mounted near the center of said back substantially equidistant from the ends of said back and accessible only upon separation of the inner edges of the mounted loose sheets, and means responsive to a depressing movement of said finger piece towards said back for releasing said holding means, to permit said two rows of prongs to swing about their pivotal supports into different planes.

23. A loose leaf binder comprising a back, a pair of covers hinged to said back, two pivotally supported opposed rows of substantially straight sheet retaining prongs extending across said back in a single plane, and movable towards and away from each other, latch means for holding said prongs substantially in said plane during movement of said prongs towards and away from each other, an operating member accessible for operation only near the approximate center of the back inwardly of the inner edges of the mounted loose sheets for releasing said latch means to permit said two rows of prongs to swing about their pivotal supports into different planes, and means automatically operable upon mere hand manipulation of either one of said prong rows from said different plane to said single plane, for operating said latch means to relock said last-mentioned prong row in said single plane.

24. A loose leaf binder comprising a back, a pair of covers hinged to said back, two opposed rows of substantially straight sheet retaining prongs, pivotally supported for movement from different planes to a single plane parallel to said back, and movable towards and away from each other, stop means for preventing angular movement of said prongs inwardly towards said back beyond approximately said single plane, means automatically operable when either one of said prong rows is moved into said single plane and limited by said stop means for locking said prong row in said plane for endwise movement therein, and a latch finger piece approximately near the center of said back for releasing said locking means.

CLARENCE W. VOGT.
EINO E. LAKSO.